(12) United States Patent
Fritz, II (10) Patent No.: US 7,174,925 B2
(45) Date of Patent: Feb. 13, 2007

(54) TIRE PURGE/FILL APPARATUS AND METHOD FOR USE IN A RACING ENVIRONMENT

(75) Inventor: Wayne E. Fritz, II, Blue Springs, MO (US)

(73) Assignee: Racing Air Products, LLC, Raymore, MO (US)

( * ) Notice: Subject to any disclaimer, the term of this patent is extended or adjusted under 35 U.S.C. 154(b) by 0 days.

(21) Appl. No.: 11/462,261

(22) Filed: Aug. 3, 2006

(65) Prior Publication Data

US 2006/0243343 A1  Nov. 2, 2006

Related U.S. Application Data

(60) Provisional application No. 60/595,889, filed on Aug. 15, 2005.

(51) Int. Cl.
*B65B 1/04* (2006.01)
(52) U.S. Cl. ............................................ 141/38; 141/65
(58) Field of Classification Search .................. 141/38, 141/65, 59, 98; 137/223, 227, 228, 229
See application file for complete search history.

(56) References Cited

U.S. PATENT DOCUMENTS 3,498,341 A * 3/1970 Spereberg ...................... 141/4

5,967,198 A * 10/1999 Smalley ...................... 141/38

OTHER PUBLICATIONS

Camair Tire Management; "2006 Product Line—Tour-2000 Tire Management System and Pro-3000 Tire Management System;" Website: http://www.camairracing.com/product/htm (Product Line) ; Aug. 4, 2006; 3 pages; Amherst, New York.

* cited by examiner

*Primary Examiner*—Steven O. Douglas
(74) *Attorney, Agent, or Firm*—Blackwell Sanders Peper Martin LLP; Samuel Digirolamo (57) ABSTRACT

A tire purge/fill apparatus for both purging air and other contaminants from a tire to be filled and for filling a tire with nitrogen or other gases to a pre-determined pressure, the apparatus including a supply of gas, a filter member for filtering the gas before entry into the tire to be filled, a valve mechanism for controlling the purging and filling operations, a vacuum pump coupled in fluid communication with the valve mechanism, and a supply hose for attachment to the tire to be purged and/or filled, the valve mechanism including at least one user selectable member positionable in at least one position for effecting the filling operation and positionable in at least another position for effecting the purging operation. A manifold member is also disclosed for attachment to the present apparatus for use in filling a plurality of tires at the same time.

27 Claims, 8 Drawing Sheets

TIRE PURGE/FILL APPARATUS AND METHOD FOR USE IN A RACING ENVIRONMENT

CROSS REFERENCE TO RELATED APPLICATION

This application claims the benefit of U.S. provisional application Ser. No. 60/595,889, filed Aug. 15, 2005 the disclosure of which is incorporated herein by reference.

BACKGROUND OF INVENTION

The present invention relates generally to a tire inflation/fill system and, more particularly, to a tire purge/fill system for controlling the build-up of tire pressure in an automobile racing environment.

Controlling the build-up of tire pressure during a racing event is always a major concern and challenge due to the fact that automobile tires heat up during a race and such heat causes the air, gas, moisture and other contaminants contained within the tire to expand and increase tire pressure. If this build-up of tire pressure is left unchecked, tire blow-outs and other tire deformation can occur. This obviously impedes the performance of the motor vehicle as well as raises safety concerns in a racing environment. In order to control this build-up of tire pressure in a racing environment, many pit crews and racing associations, such as NASCAR, use nitrogen instead of air to inflate the tires of racing vehicles. The characteristics of nitrogen as compared to air and other gases is much better for controlling the build-up of tire pressure during a racing environment since the expansion of nitrogen due to an increase in temperature is lower and better controlled as compared to air and other gases.

Evacuating all air from a tire and inflating the tire solely with nitrogen is a time consuming process. For example, one method currently used in an attempt to purge racing tires of all air prior to inflating them with nitrogen is as follows. Typically, all tires used by a particular pit crew for a particular race are lined up side-by-side. The valve stem associated with each respective tire is removed and the tire is bled of all pressurized air contained therein. Once the tires are deflated, the valve stems are replaced and the tire is filled with nitrogen. It is important to purge all air out of the tire before final inflation with nitrogen because if air is mixed with the nitrogen, air will expand at a different rate as compared to the nitrogen and the increase in tire pressure during a particular race will be greater than if all air was previously purged from the tire. The same is likewise true with respect to any moisture or other contaminants trapped within the tire. Moisture and other contaminants will likewise expand at a different expansion rate when exposed to a rise in temperature thereby further increasing the build-up of pressure in the tire during a particular racing event. In this regard, in an effort to purge the nitrogen from contaminants prior to entering the tire, a one-stage dryer or filter/absorption system is typically used to purge the nitrogen from oxygen and other contaminants prior to entry into the tire. The purer the nitrogen, the better the tire pressure can be controlled.

In an effort to substantially purge a particular tire from all air and other contaminants and to ensure that the tire is filled substantially with only nitrogen, several purging and filling sequences are typically accomplished. For example, once a tire is initially purged and filled with nitrogen, the valve stem is again removed and the nitrogen is allowed to at least partially evacuate the tire before the valve stem is again inserted and the tire is again inflated with nitrogen to a predetermined pressure. This evacuation and refilling process may occur several times in an effort to ensure that all air and other contaminants are evacuated from the tire. The tire is then filled to a predetermined pre-race pressure which is typically below racing pressure. Calculations are made as to the rate of tire pressure increase during a particular race so that the proper predetermined pre-race pressure can be established.

The purge/fill process currently used in many racing environments is time consuming and does not ensure that all air is bled from the tire since the valve stem is completely removed during each intervening evacuation and fill process.

It is therefore desirable to design and implement a tire purge/fill apparatus and system which improves the quality of the nitrogen being supplied to the tire, which is easily manipulated to both purge and fill a particular tire with nitrogen including accomplishing intervening purging and refilling operations, which is less time consuming, and which produces more consistent results with respect to all tires being filled including providing a consistent concentration or purity of nitrogen to each respective tire being filled.

Accordingly, the present invention is directed to overcoming one or more of the problems set forth above.

SUMMARY OF INVENTION

In one aspect of the present invention there is disclosed a tire purge/fill apparatus which includes a filter/absorption member which filters, dries and purifies the nitrogen as it is being supplied to a respective tire, a valving mechanism which includes an on/off valve as well as a two-way diverter valve for both filling a particular tire with nitrogen as well as drawing a vacuum to purge a particular tire from air and other contaminants, a digital tire pressure gauge for monitoring the tire pressure and for achieving a predetermined tire pressure during the filling operation, and appropriate hoses and coupling devices for both operatively connecting the present apparatus to a nitrogen source and to a respective tire or tires to be filled.

The present filter/absorption member is used to both dry the nitrogen as it is being supplied from the nitrogen source and to filter and purify the nitrogen prior to entry into a particular tire. This is accomplished through the use of two molecular sieve beds associated with the filter/absorption member. As the nitrogen enters the filter/absorption member, it is first introduced into a Z3-06 molecular sieve bed which acts as a drying agent for pulling and absorbing any moisture associated with the nitrogen as it is passed through this portion of the filter/absorption member. Any moisture associated with the nitrogen will be selectively absorbed into the Z3-06 material and the remaining nitrogen is then passed into a carbon molecular sieve bed for final preparation before entry into the present valving mechanism. As the nitrogen enters the carbon molecular sieve bed, the carbon material purifies the remaining nitrogen and absorbs all other gases or other contaminants associated with the nitrogen leaving dry and purified nitrogen available for use during the purging/filling operation as will be hereinafter further explained. Although various types of filter/absorption systems can be used in association with the present apparatus, use of a two-stage filter/absorption member which both dries and purifies the nitrogen before introduction into a racing tire greatly improves the consistency and purity of the nitrogen being used in each application.

Once the nitrogen exits the filter/absorption member, it is ready for introduction into the valving mechanism associated with the present system. In one embodiment, the valving mechanism includes both an on/off valve and a two-way diverter valve. When in its "on" position, the on/off valve merely allows the flow of nitrogen passing through the filter/absorption member to continue on its way to the two-way diverter valve which controls either the purging or filling operation. When this valve is in its "off" position, nitrogen flow is prohibited from flowing into the two-way diverter valve.

With the on/off valve in its "on" position, dried and purified nitrogen will continue to flow through a pneumatic vacuum pump enroute to the tire to be filled. A two-way diverter valve is associated with the vacuum pump and includes a selectively positionable two position switch. When the diverter valve is in a first position, the vacuum pump remains in its off position and nitrogen is allowed to flow through the vacuum pump and through appropriate hoses and connections to the tire to be filled. When in its second position, the two-way diverter valve allows the vacuum pump to draw a vacuum on the tire to be filled so as to purge the tire of air and other contaminants. An exhaust port is associated with the diverter valve or the vacuum pump for allowing air and other contaminants drawn from the tire to be easily purged and exhausted from the present mechanism.

Because the two-way diverter valve is easily operated by a user through the use of an easily manipulated two position switch, both purging and filling a particular tire with nitrogen can be easily and quickly accomplished without repeatedly removing the valve stem associated with the tire to be filled during successive evacuation and fill operations. For example, once a tire has been bled of all pressurized air and the valve stem has been replaced, the present apparatus is attached to the valve portion of the tire and the tire can be further purged of atmospheric air and other contaminants by moving the on/off valve to the "on" position and by moving the two-way diverter valve to the "vacuum" or "purge" position. Once the tire has been initially purged and evacuated of atmospheric air and other contaminants, the tire can now be easily filled with nitrogen by simply moving the two-way diverter valve to its "fill" position. Once the tire has been filled with nitrogen, to a predetermined pressure, the two-way diverter valve can again be immediately positioned to its "vacuum" or "purge" position whereby nitrogen and any other gases or contaminants contained within the tire will again be purged from the tire and exhausted through the exhaust port associated with the diverter valve. The tire can be at least partially evacuated of nitrogen and any other gases or contaminants contained therein and can then immediately be refilled by simply repositioning the diverter valve to the "fill" position. As a result, successive intervening purging and filling of the same tire can be accomplished in a matter of seconds or minutes without removing the valve stem associated with the respective tire.

In another aspect of the present invention, there is disclosed a tire purge/fill apparatus which includes a filter/absorption member, a pressure relief valve positioned between the supply of nitrogen gas and the filter member for monitoring and controlling the pressure of the gas being supplied to the remainder of the system, a pressure regulator positioned between the pressure relief valve and the filter member for controlling the pressure of the nitrogen gas being introduced into the filter member, a valve mechanism which includes a single user selectable joy stick handle member for controlling both the purging and filling operation, a pressure gauge for monitoring the tire pressure during a filling operation, and appropriate hoses and coupling devices for operatively connecting the present apparatus to the nitrogen source and to a respective tire or tires to be filled. In this particular embodiment, the valve mechanism includes a three position joy stick handle member which is moveable to a first position wherein the valve mechanism is closed and no purging or filling of a respective tire can occur, to a second position wherein a filling operation can occur, and to a third position wherein the vacuum pump is activated and a purging operation can occur. Use of a single three position joy stick type handle member or other user selectable member replaces the on/off valve and the two-way diverter valve associated with the first valve mechanism embodiment and greatly simplifies the purging and filling operations. This embodiment likewise includes a convenient carrying assembly for transporting the present apparatus from one location to another including a removable cover member for accessing operation of the valve mechanism.

In still another aspect of the present invention, a manifold member is provided for attachment to the present tire purge/fill apparatus for use in filling a plurality of racing tires at one time. The manifold member includes appropriate inlet attachment means for quickly attaching to and detaching from an appropriate hose associated with the present apparatus and includes a plurality of outlet ports likewise having appropriate means associated respectively therewith for attaching and detaching hoses having appropriate tire chucks associated therewith for attachment to the respective valve stems of the tires to be filled. Each outlet port associated with the manifold member as well as the inlet connection thereto is equipped with an on/off valve so that nitrogen can be directed from the present apparatus to the appropriate outlet ports for filling respective tires. Some outlet ports can be positioned in the "on" or "fill" position whereas other outlet ports can be positioned in the "off" position where no tire is being filled through that particular outlet port. Any number of outlet ports can be associated with the present manifold member.

Use of the present tire purge/fill apparatus allows an operator to quickly change from a purging operation to a filling operation without manually removing the valve stem from each respective tire to be filled between each intervening purging/refilling operation. Also, because of the two-stage filter/absorption member associated with the present apparatus, drying and purifying the nitrogen before entry into a particular tire is more effectively accomplished thereby improving and increasing the consistency and purity of the nitrogen being provided to each respective tire. The present invention also teaches a method for inflating racing tires which substantially reduces the overall time in effectively filling such tires to a predetermined pre-race tire pressure.

These and other aspects and advantages of the present invention will become apparent to those skilled in the art after considering the following detailed description in connection with the accompanying drawings.

BRIEF DESCRIPTION OF DRAWINGS

For a better understanding of the present invention, reference may be made to the accompanying drawings.

DETAILED DESCRIPTION

Figure 1:
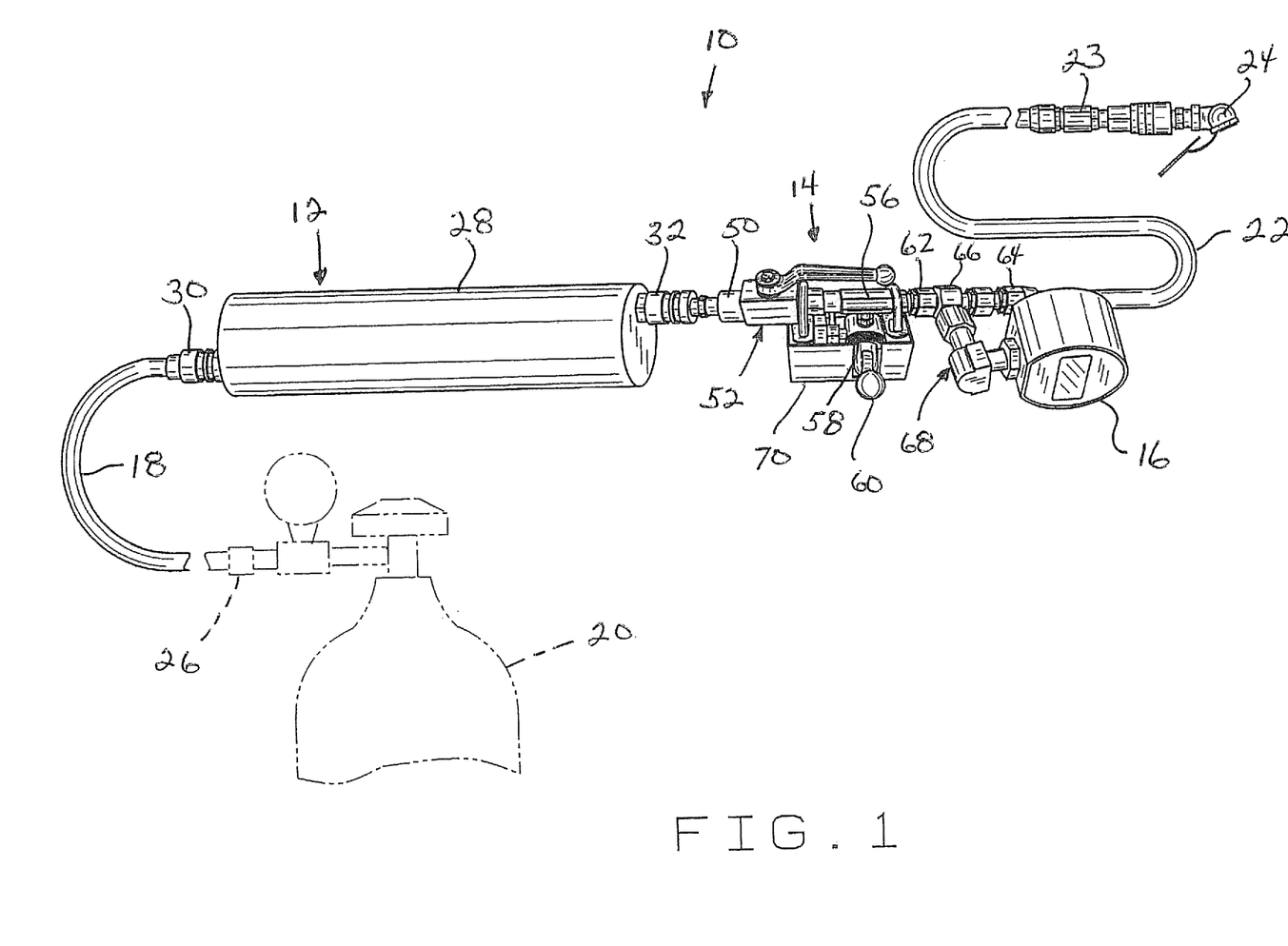
FIG. 1 is a perspective view of one embodiment of the present tire purge/fill apparatus constructed according to the teachings of the present invention.

Referring to the drawings more particularly by reference numbers wherein like numerals refer to like parts, the numeral 10 in FIG. 1 identifies one embodiment of a tire purge/fill apparatus constructed according to the teachings of the present invention. The apparatus 10 includes a filter/absorption member 12, a valve mechanism 14, a digital pressure gauge 16, a hose 18 for connecting the filter/absorption member 12 in fluid communication with a nitrogen supply 20, and a hose 22 having a tire chuck 24 associated therewith coupled in fluid communication with the valve mechanism 14. The hose member 18 includes an associated connector 26 constructed so as to be compatible for attachment to any suitable type of valve fitting associated with any suitable nitrogen source 20 to which the present apparatus 10 will be connected. It is recognized that the present apparatus 10 including its various component parts such as the filter/absorption member 12, the valve mechanism 14, and the digital pressure gauge 16 can be fashioned into a variety of different sizes and shapes other than those illustrated herein without departing from the teachings and practice of the present invention.

Figure 2:
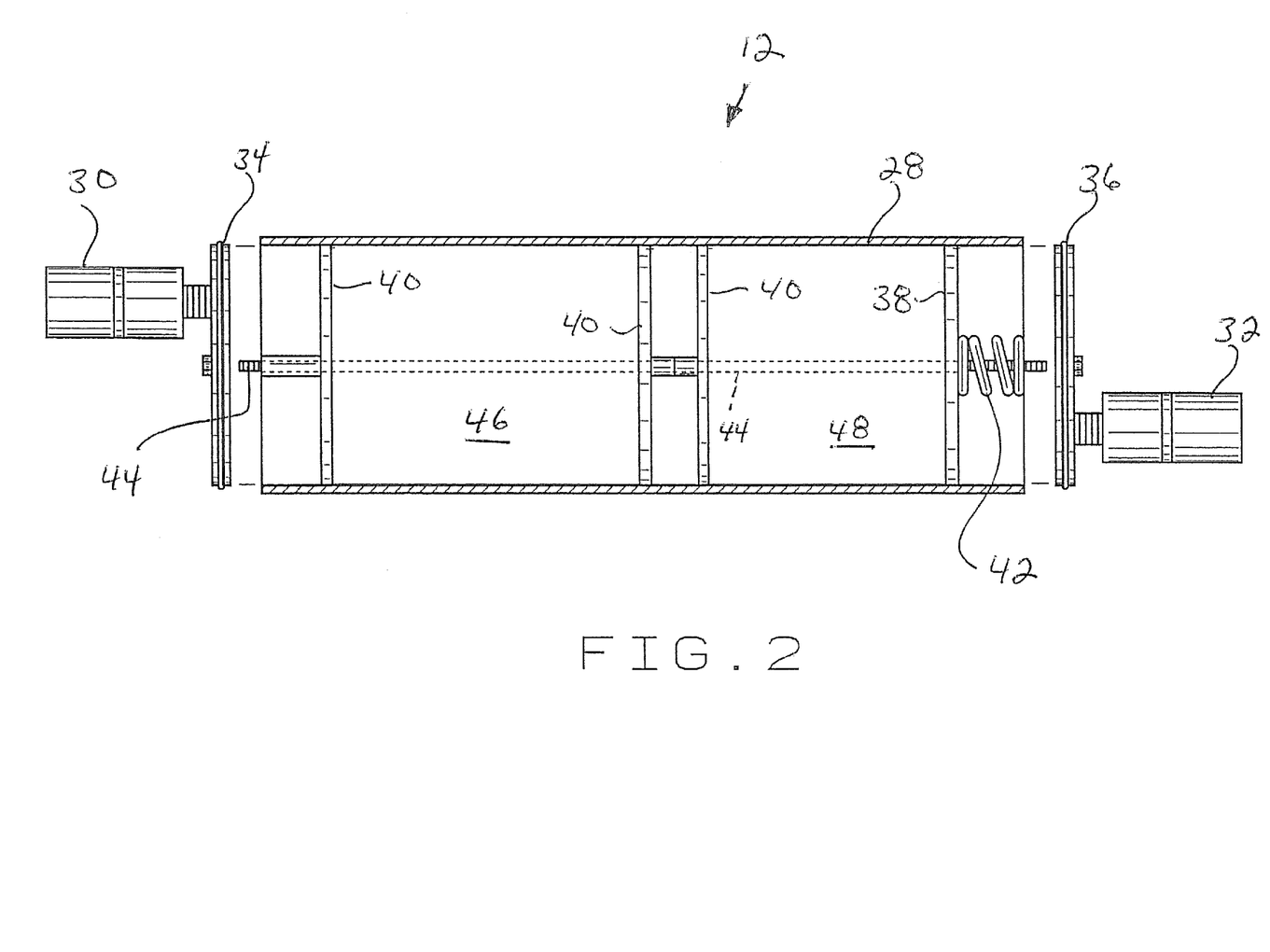
FIG. 2 is a partial cross-sectional view of the filter/absorption member associated with the apparatus of FIG. 1.

More particularly, the present filter/absorption member 12 as best illustrated in FIGS. 1 and 2 includes a generally cylindrically shaped housing member 28 having an inlet connection member 30 associated with one end portion thereof for compatible connection to a corresponding connection fitting associated with hose member 18, and having an outlet connection member 32 associated with its opposite end portion for compatible connection to the valve mechanism 14 as will be hereinafter further explained. The inlet and outlet connection members 30 and 32 are associated respectively with end cap members 34 and 36, the cap members 34 and 36 typically being attached to the housing member 28 through the use of a rubber O-ring seal member. The member 12 includes a movable support plate member 38 associated with the outlet side of the member 12 and a plurality of other support plate members 40 positioned and located within the cylindrical housing 28 as best illustrated in FIG. 2. Spring member 42 is biased against members 36 and 38 as illustrated in FIG. 2 and a rod member 44 extends therethrough as well as through the support plate members 38 and 40 as best illustrated in FIG. 2. The plate members 38 and 40 are perforated so as to allow the nitrogen gas to flow therethrough and such members define two distinct chambers 46 and 48 each housing a molecular sieve bed. In the particular embodiment illustrated in FIG. 2, chamber 46 houses a Z3-06 molecular sieve bed which is comprised of Z3-06 absorbent material which selectively dries the nitrogen gas as it passes therethrough thereby pulling and absorbing moisture into the Z3-06 material. As the nitrogen passes through the perforated support plates 40 between chambers 46 and 48, it passes into chamber 48 which typically houses a carbon molecular sieve bed. The carbon molecular sieve bed functions to separate and absorb oxygen and other gases and other contaminants which may be associated with the nitrogen gas as it passes through chamber 48 thereby purifying the nitrogen before exiting the member 12. The contaminants, other gases and moisture previously associated with the nitrogen are absorbed by the molecular sieve beds and are retained therein until subsequently purged through conventional means.

The structure and operation of the sieve beds associated with filter/absorption member 12 as illustrated in FIGS. 1 and 2 are substantially conventional in nature, one aspect of the present invention lying in the use of a two-stage filter/absorption member 12 wherein the nitrogen entering such filter/absorption member is both dried and purified upon exit therefrom. Although the present invention discloses the use of a Z3-06 molecular sieve bed and a carbon molecular sieve bed for accomplishing the dual function separation process, it is recognized and anticipated that these separation processes can be accomplished through the use of other appropriate absorbent materials utilized in the sieve beds such as special granulated materials for both selectively absorbing moisture and other gases from the nitrogen as it passes therethrough. It is also recognized and anticipated that other filter and absorption systems can likewise be used so long as both the moisture and other gases associated with the nitrogen supply are removed therefrom before the nitrogen is exposed to valve mechanism 14 as will be hereinafter further explained. Properly and effectively filtering the incoming nitrogen gas before it is introduced into a racing tire is important because effective filtration not only improves the overall efficiency of the tire in a racing environment but it also improves and increases the nitrogen concentration and purity provided to the tire so that the build-up of tire pressure during a race can be adequately controlled.

Figure 3:
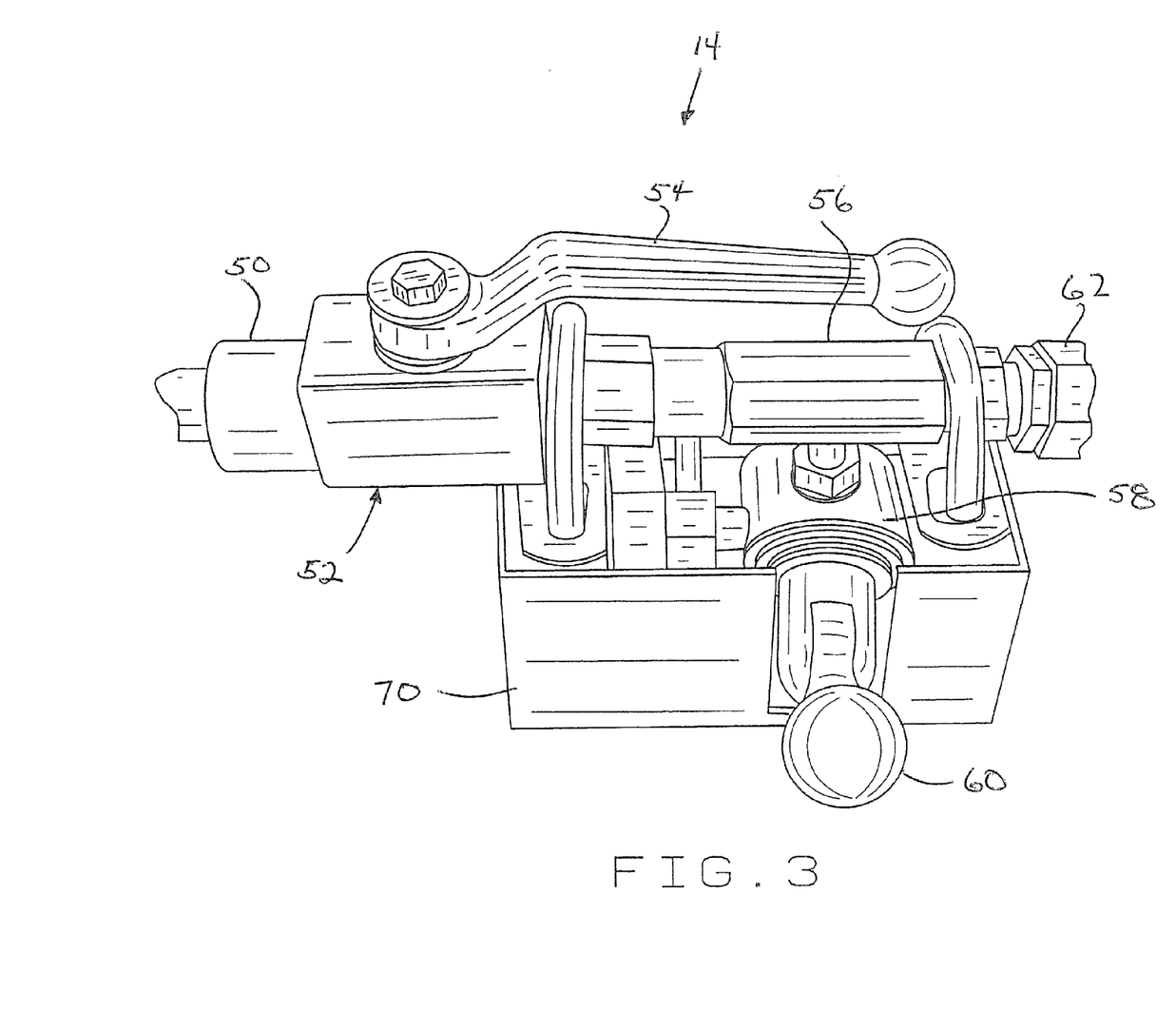
FIG. 3 is a partial perspective view of the valve mechanism associated with the apparatus of FIG. 1.

The present apparatus 10 further includes a valving mechanism 14 as best illustrated in FIGS. 1 and 3. The valve mechanism 14 is coupled to the outlet connection member 32 associated with the filter/absorption member 12 in a conventional manner such as through the use of a conventional coupling member 50 and includes an on/off valve 52 which is operated via the handle member 54. The valve member 52 is a simple two position on/off valve actuated through the positioning of handle member 54 wherein handle member 54 can be moved from an "on" position to an "off" position. When valve member 52 is in its "off" position, nitrogen flow from the filter/absorption member 12 is prohibited and such flow is therefore prevented from flowing to the remainder of the present apparatus. When the valve member 52 is in its "on" position, the on/off valve allows the flow of nitrogen passing through the filter/absorption member 12 to continue to flow to the remainder of the present apparatus as will be hereinafter further explained. A typical on/off valve member suitable for use in the present apparatus is a Dyna Quip On/Off Valve, Part Number 475.

When the valve member 52 is positioned in its "on" position, dried and purified nitrogen will flow from the filter/absorption member 12 through valve member 52 and through a pneumatic vacuum pump 56 to a two-way diverter valve 58 associated with the vacuum pump. Vacuum pump 56 is likewise coupled to the on/off valve member 52 in a conventional manner. The two-way diverter valve 58 includes a selectively positionable two position switch or toggle member 60 which controls operation of the vacuum pump 56. When the diverter valve 58 is in a first position or a "fill" position, the vacuum pump 56 remains in its "off" state and nitrogen is allowed to flow through the vacuum pump 56 and through appropriate connections and hoses such as the hose 22 to the tire to be filled. In this regard, hose 22 is coupled in fluid communication with vacuum pump 56 through appropriate coupling devices such as coupling members 62 and 64. As best illustrated in FIG. 1, a digital tire pressure gauge 16 is likewise coupled to the present apparatus between coupling members 62 and 64 through the use of a gauge port member 66 and other appropriate coupling members 68. As previously stated, when the on/off valve member 52 is in its "on" position and when the diverter valve 58 is in its "fill" position, nitrogen will flow through the vacuum pump 56 and through the appropriate couplings 62, 64 and 66, and through hose 22 to the tire to be filled. In this regard, hose 22 includes an appropriate tire chuck 24 for engaging the valve stem of a tire to be filled. Hose 22 may also include a quick connect/disconnect coupling member 23 for quickly attaching and detaching the tire chuck 24 thereto for reasons which will be hereinafter further explained.

When the diverter valve member 58 is in its second position or its "purge" position, the valve 58 allows the vacuum pump to operate and to draw a vacuum on the tire to be filled through the hose 22 so as to purge the tire of air and other contaminants. The vacuum pump 56 will continue to operate and to draw a vacuum as long as the diverter valve member 58 is in its second or "purge" or "vacuum" position. An exhaust port (not shown) is associated with the diverter valve 58 or with the vacuum pump 56 for allowing air and other contaminants drawn from the tire to be easily exhausted from the valve mechanism 14. Movement of the toggle member or switch 60 therefore allows a user to easily control both the purging and filling of a particular tire with nitrogen. A user can easily manipulate the two position switch 60 and can easily and quickly switch back and forth between a filling operation and a purging operation without repeatedly removing the valve stem associated with the tire to be filled during each successive purging and filling operation. The vacuum pump 56 and diverter valve 58 may be at least partially enclosed or encased with a housing member for protecting the various components associated therewith such as through the use of a protective guard or housing member 70. The member 70 can be made of any suitable material so as to provide protection to the components enclosed therewithin during normal use and operation of the present apparatus.

Operation and use of the present apparatus can be accomplished in the following manner. The valve stem associated with a particular tire to be inflated with nitrogen is removed and all pressurized air contained therein is allowed to escape to atmosphere. Once the tire has been bled of all pressurized air, the valve stem is replaced and the tire is ready for additional purging and inflation. The hose 18 is then connected in fluid communication with the appropriate nitrogen source 20 and the tire chuck 24 is attached to the valve stem of the tire to be filled. The supply pressure of the nitrogen source 20 is then set; the on/off valve member 52 is moved to the "on" position; and the diverter valve 58 through switch member 60 is moved to its "purge" position. In this position, vacuum pump 56 is activated and a vacuum is pulled through hose 22 and tire chuck 24 so as to purge and exhaust atmospheric air, other gases, and other contaminants contained within the tire. During this purging process, the user will physically watch the tire and as the vacuum is drawn on the tire, the tire will begin to collapse to a predetermined level or condition. All purged gases and contaminants drawn from the tire are exhausted through the exhaust port (not shown) associated with either the diverter valve 58 or the vacuum pump 56. Once the appropriate vacuum has been drawn on the tire, the operator will then move the two position switch 60 associated with the diverter valve 58 to its "fill" position and inflation of the tire with nitrogen will begin. Movement of the switch 60 to the "fill" position will immediately shut off the vacuum pump 56 and will thereafter allow dried and purged nitrogen from the filter/absorption member 12 to flow through the hose 22 and tire chuck 24 to the tire to be filled. The tire pressure gauge 16 can be monitored during the filling operation and the tire can be filled to a predetermined tire pressure.

Once the tire has been filled with nitrogen to a predetermined pressure, the diverter valve 58 can again be immediately positioned to its "vacuum" or "purge" position whereby nitrogen and any other gases or contaminants still remaining within the tire will again be purged from the tire and exhausted through the exhaust port associated with diverter valve 58. The tire can again be at least partially evacuated of nitrogen and any other gases or other contaminants contained therein to a predetermined level based upon physically viewing the collapsing of the tire and once the predetermined purge condition has been obtained, the user can then immediately begin to refill the tire with nitrogen by simply repositioning the diverter valve 58 to its "fill" position. This procedure and system can be repeated any number of times to ensure complete purging of the tire of any air and other contaminants. As a result, successive intervening purging and filling of the same tire can be accomplished in a matter of seconds or minutes without ever removing the valve stem associated with the respective tire. Once a particular tire has been adequately filled to its predetermined pre-race tire pressure, the tire chuck 24 can be removed from such tire and the purging and filling of another tire can begin.

Figure 4:
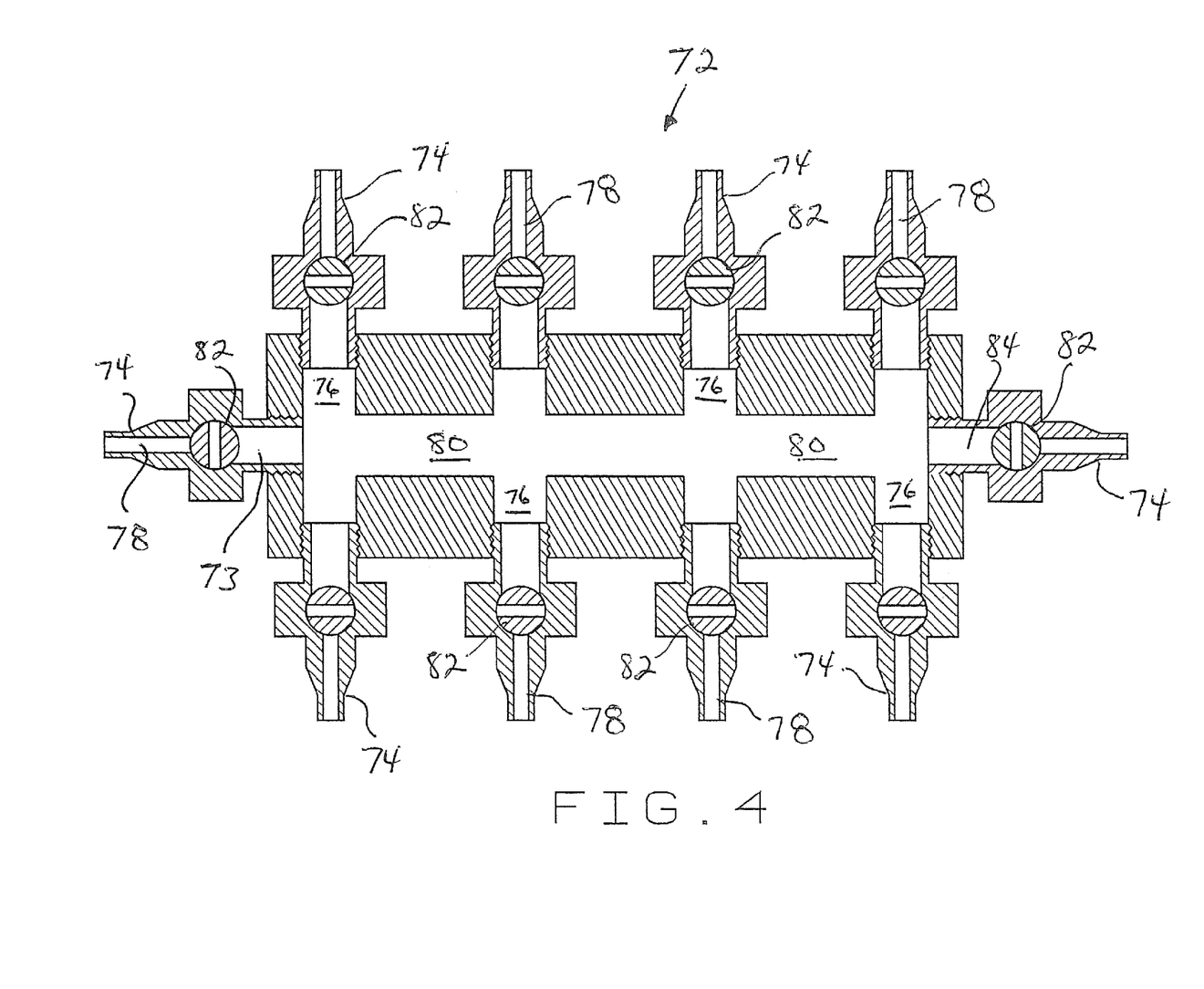
FIG. 4 is a cross-sectional view of a manifold member which can be used in association with the apparatus of FIG. 1.

In another aspect of the present invention, one embodiment of a manifold member 72 is provided as illustrated in FIG. 4 for attachment to the present tire purge/fill apparatus 10 for use in filling a plurality of racing tires at the same time. The manifold member 72 includes an appropriate inlet passageway or port 73 having an appropriate connection member associated therewith such as the quick connect/disconnect member 74 for quickly attaching to and detaching from supply hose 22. In this regard, tire chuck 24 is removed from the coupling member 23 and the coupling member 23 is thereafter connected to inlet connection member 74 in a conventional manner. This attaches the manifold member 72 to the supply of nitrogen 20 for purging and filling a plurality of tires as will be hereinafter explained. The manifold member 72 further includes a plurality of outlet ports 76 each likewise having appropriate means such as the member 74 for attaching and detaching to appropriate hoses having tire chucks associated therewith for attachment to the respective valve stems associated with the plurality of tires to be filled. In this regard, a hose similar to hose 22 having appropriate coupling members associated therewith will be attachable to each connection member 74 associated with each outlet port 76, each of these hoses in turn being attachable to the plurality of tires to be filled through the use of the respective tire chucks as previously explained.

Each outlet port 76 is connected in fluid communication with the passageway 78 extending through each respective coupling member 74 as well as to the main flow conduit or passageway 80 extending longitudinally through the manifold member 72 from the inlet passageway 73. Each outlet port 76 or its respective coupling member 74 likewise includes a conventional on/off valve 82 for allowing nitrogen to flow from the main passageway 80, through the respective outlet ports 76, and through the respective coupling members 74 associated therewith when the on/off valve 82 is placed in its "on" position. When the manifold member 72 is coupled to the present apparatus 10, nitrogen from the nitrogen source 20 can be directed from the present apparatus 10 to the appropriate outlet ports 76 for filling the respective tires. Obviously, some of the on/off valves 82 associated with the respective outlet ports 76 can be positioned in the "on" or "fill" position whereas other valves 82 associated with other outlet ports 76 can be positioned in the "off" position where no tire is being filled through that particular outlet port.

Although the manifold member 72 illustrated in FIG. 4 illustrates the use of eight (8) separate outlet ports 76 with associated coupling members 74, it is recognized and anticipated that any number of outlet ports can be associated with the present manifold member. It is also recognized that the inlet port 73 likewise includes an on/off valve 82 for likewise controlling the flow of nitrogen to the manifold member 72. Still further, the manifold member 72 may likewise include an outlet port or passageway 84 in fluid communication with passageway 80 for connecting the manifold member 72 to another similarly constructed manifold member for increasing the plurality of tires to be filled at any one time. In this regard, outlet passageway 84 would likewise include a suitable coupling member such as coupling member 74 for attaching to an appropriate adaptor member or other coupling members or hoses for attaching the manifold member 72 to another similarly constructed manifold member. Outlet port 84 and/or coupling member 74 associated therewith will likewise include an on/off valve 82 for likewise controlling the flow of nitrogen through the outlet port 84. It is recognized and anticipated that any number of manifold members such as the manifold member 72 may be connected in series to increase the plurality of tires to be filled at any one time. It is also recognized and anticipated that when the manifold member 72 is being used to fill a plurality of tires at one time, the supply hose associated with each outlet port 76 and its respective coupling member 74 for connecting the manifold 72 to the respective tires to be filled can likewise include a digital tire pressure gauge similar to the tire pressure gauge 16 illustrated in FIG. 1. In this particular embodiment, the tire pressure gauge 16 will be coupled to the respective filling or supply hose in a conventional manner and the tire pressure associated with each respective tire can be monitored during the filling process.

In this particular application, when a respective tire reaches its predetermined tire pressure, the on/off valve 82 associated with that particular tire can be moved to the "off" position thereby terminating nitrogen flow to that particular tire. When each respective tire reaches its predetermined tire pressure, the respective on/off valve 82 can be moved to the "off" position and this process can be repeated until all of the plurality of tires have been filled to their predetermined tire pressure. Once this occurs, the on/off valve 82 associated with the inlet port 73 of manifold member 72 can be closed; each respective on/off valve 82 associated with each respective outlet port 76 can be opened; the diverter valve 58 can be moved to the "purge" position; and the on/off valve 82 associated with the inlet port 73 can again be opened so that purging of each respective tire can take place as discussed above. Here again, when each respective tire reaches its appropriate collapsed or purged condition, the respective on/off valve 82 associated with that particular outlet port 76 can be moved to its "off" position thereby terminating vacuum to that particular tire. This process can be repeated until all of the tires have been purged and the on/off valve 82 associated with the inlet port 73 has likewise been moved to its "off" position. Once all of the on/off valves 82 associated with the manifold member 72 have been moved to their "off" position, the diverter valve 58 can again be repositioned to its "fill" position and the process can be repeated. Any number of successive intervening purging and filling operations can be accomplished in the same manner as previously described above with respect to purging and filling a single tire. It is also recognized and anticipated that opening and closing of the valves 82 associated with manifold member 72 as well as the opening and closing of the on/off valve member 52 and movement of the two position switch 60 associated with the diverter valve 58 can be sequenced in a wide variety of different combinations in order to achieve the filling and purging of a plurality of racing tires.

Figure 5:
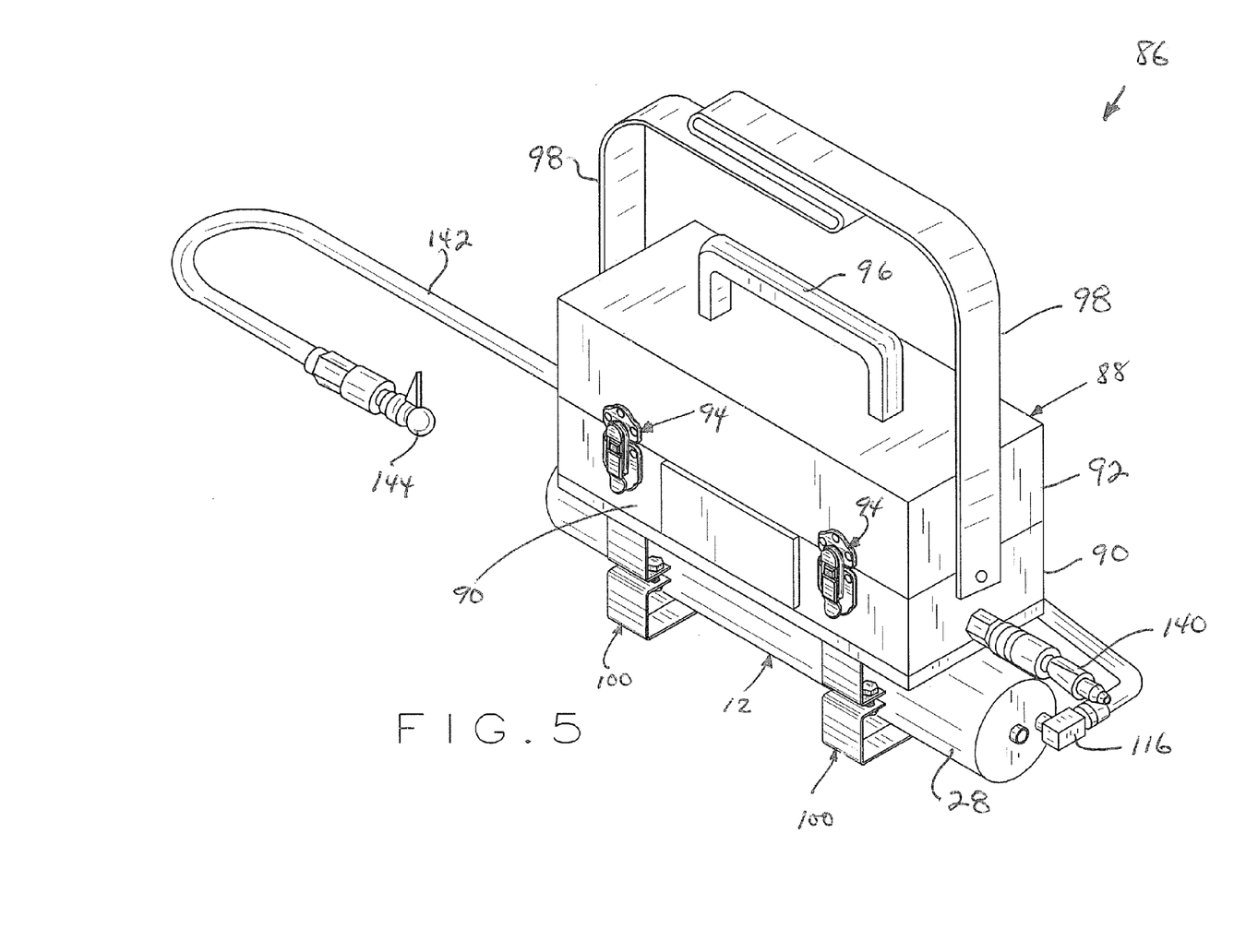
FIG. 5 is a perspective view of another embodiment of the present tire purge/fill apparatus constructed according to the teachings of the present invention.
Figure 6:
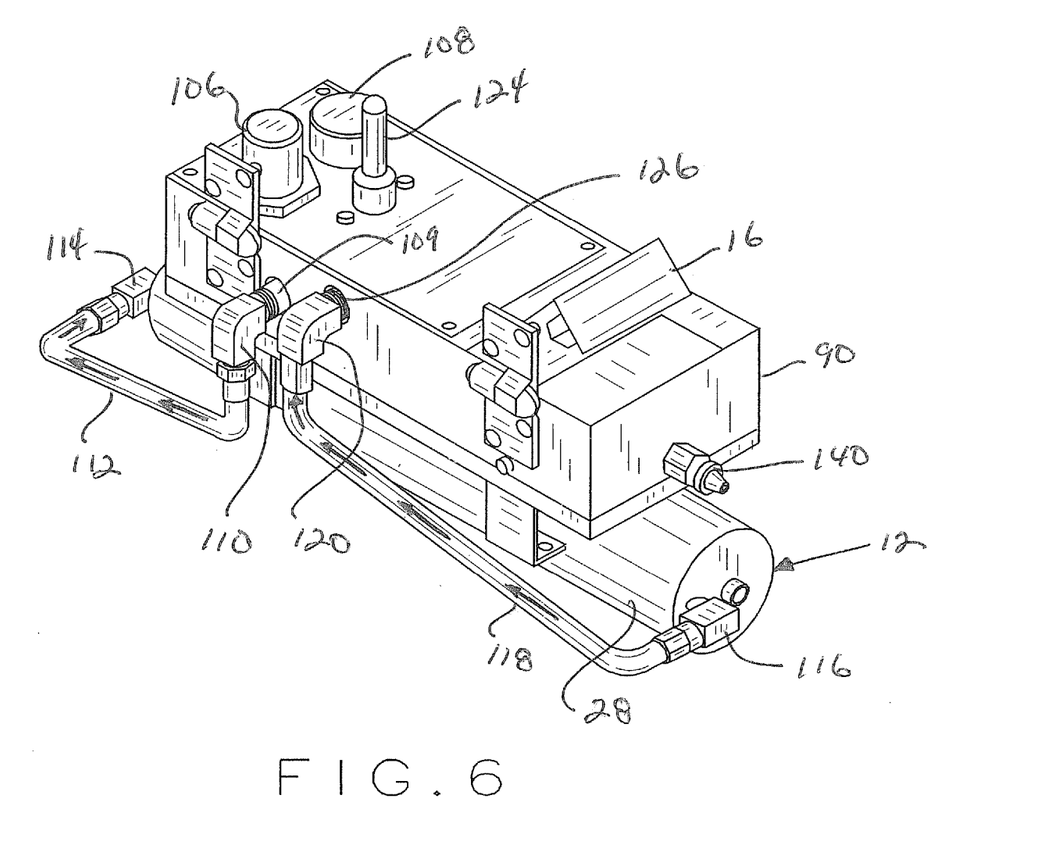
FIG. 6 is a partial perspective view of the apparatus of FIG. 5 with the housing cover member and tire supply hose removed.

FIGS. 5–9 identify another embodiment of a tire purge/fill apparatus 86 constructed according to the teachings of the present invention. The apparatus 86 is substantially similar in operation to the apparatus 10 previously described except that the previous valve mechanism 14 which included an on/off valve 52 and a two-way diverter valve 58 has been replaced with a single four-way valve mechanism having a three position joy stick type handle member for controlling the filling and purging operations as will be hereinafter explained. In addition, the apparatus 86 includes a carrier assembly 88 for housing the various components of the apparatus 86 including a body portion 90 and a removable cover member 92. Conventional latch mechanisms 94 are associated with the members 90 and 92 for removably attaching the cover member 92 to the body portion 90. The cover member 92 likewise includes a handle member 96 for easily transporting the apparatus 86 when the cover member 92 is in its closed and locked position. A strap member 98 may be fixedly attached at opposite end portions of the body portion 90 as illustrated in FIG. 5 for likewise providing a means for carrying and transporting the apparatus 86 once the cover member 92 has been removed. The body portion 90 likewise includes a pair of spaced apart bracket assemblies 100 which are attachable to the underside portion of the carrier assembly 88 for fixedly holding the filter/absorption member 12 as best illustrated in FIGS. 5 and 6. Although the routing of the piping between the various components of the apparatus 86 may differ with respect to the piping associated with the apparatus 10 illustrated in FIGS. 1–3, and although the valving mechanism is different and some of the connection and coupling members may vary as compared to the apparatus 10, the operation of the apparatus 86 is substantially similar to that previously described with respect to apparatus 10. In its simplest form, as will be hereinafter described in further detail, the tire purge/fill apparatus 86 allows nitrogen gas to flow from a nitrogen supply source such as the nitrogen supply 20 previously described, through a pressure relief valve, through a pressure regulator, through the filter/absorption member 12 which includes the sieve beds as previously described, and to the valve mechanism 122 as will be hereinafter further explained for allowing the nitrogen gas to flow either through a vacuum pump for purging the tire of air and other contaminants, or for allowing the gas to flow directly to the tire to be filled during the filling operation. A more detailed description of the embodiment 86 is set forth below.

The filter/absorption member 12 previously described with respect to FIGS. 1 and 2 of embodiment 10 is identical to the filter/absorption member utilized in embodiment 86. As a result, the description of filter/absorption member 12 set forth above including its operation is equally applicable to the filter/absorption member 12 utilized in embodiment 86. It is also recognized and anticipated that other filter and absorption systems can likewise be used so long as the moisture and other contaminants associated with the nitrogen supply are removed before the nitrogen is exposed to the valve mechanism of embodiment 86 as will be hereinafter further explained.

Figure 7:
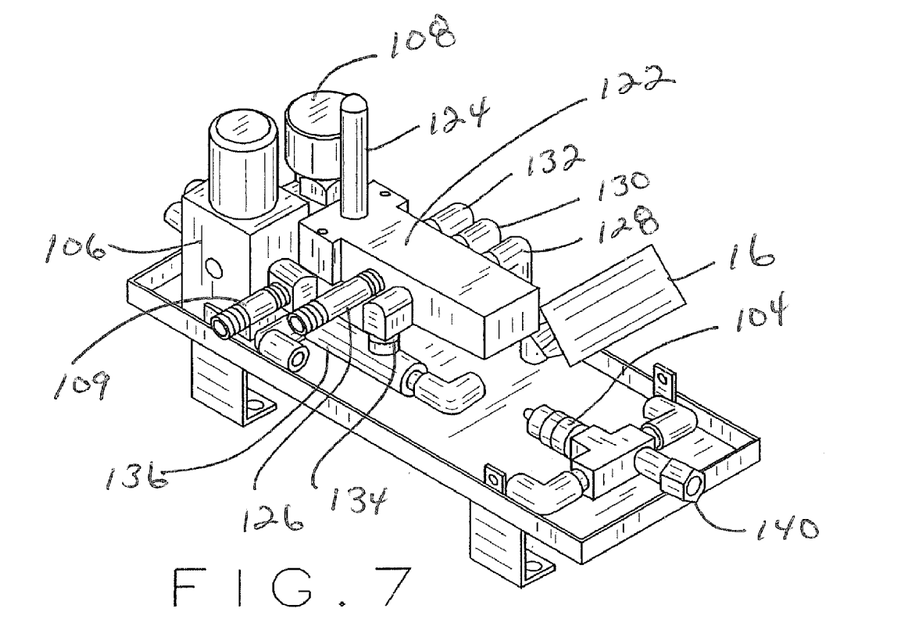
FIG. 7 is a partial perspective view of the apparatus of FIG. 6 with the lower housing body portion, filter/absorption member, and various connection members removed for ease of illustration.
Figure 8:
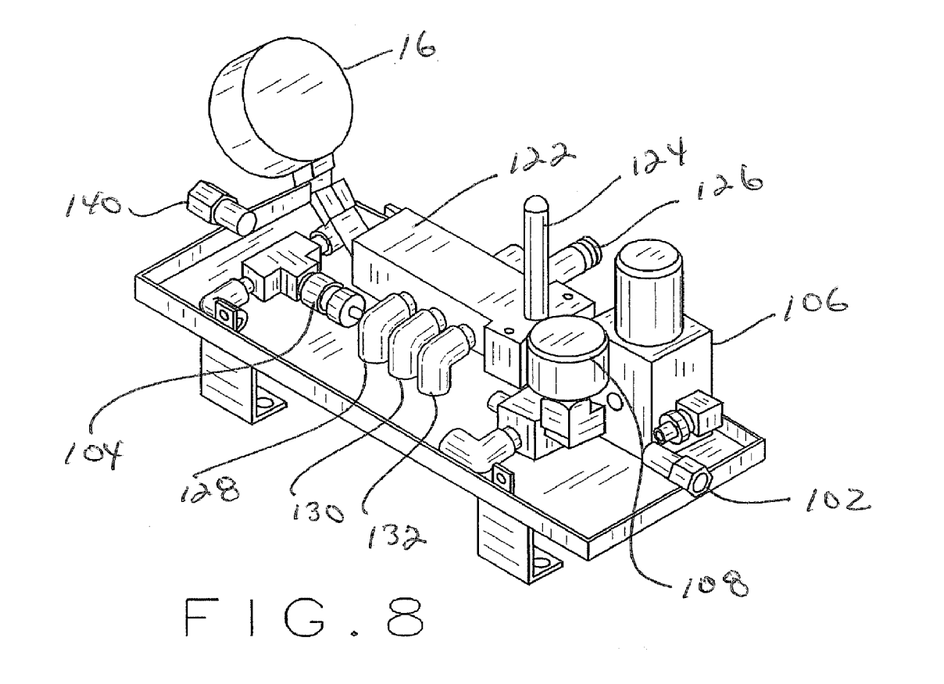
FIG. 8 is a partial perspective view similar to FIG. 7 except rotated 180° in the horizontal plane.
Figure 9:
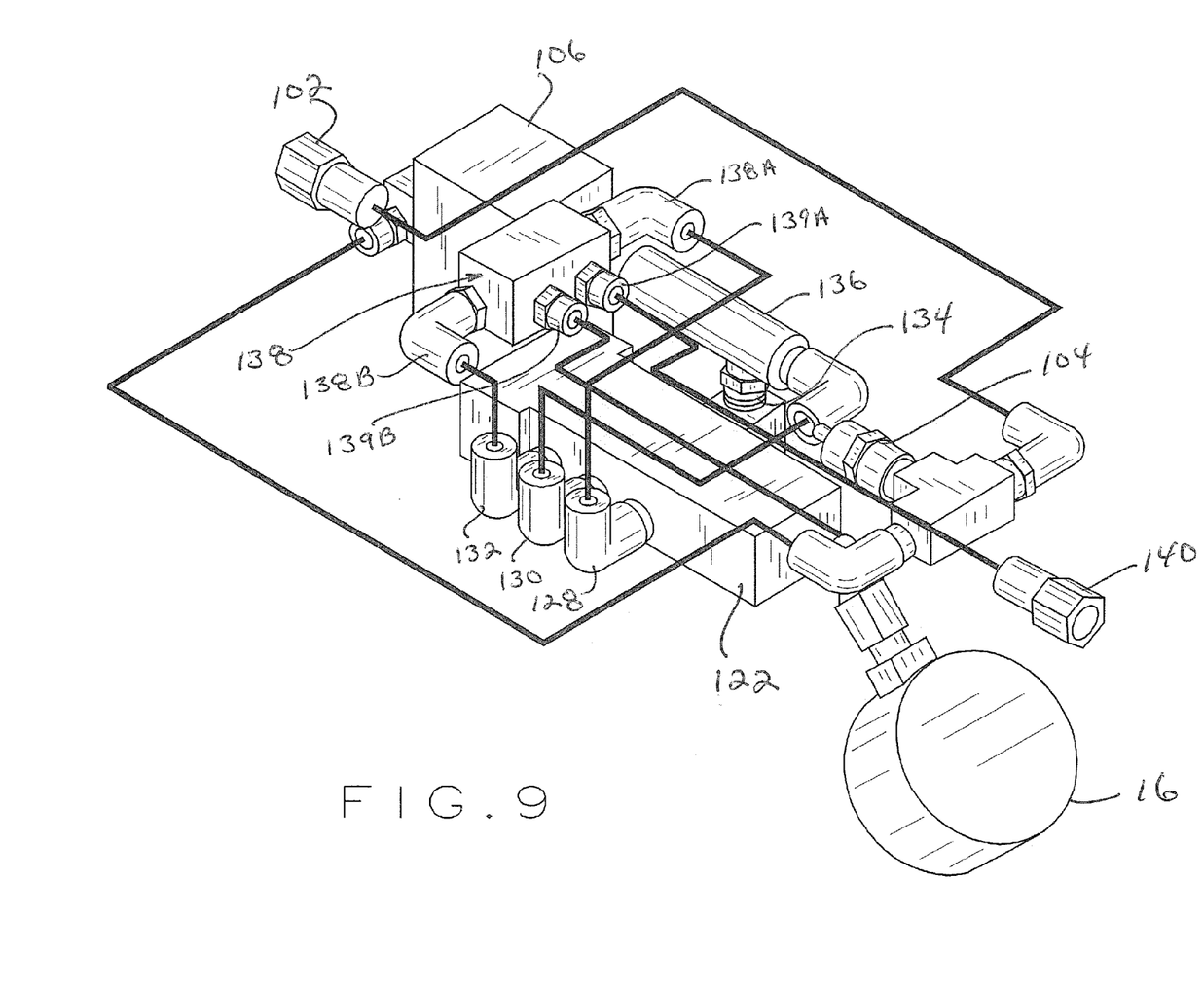
FIG. 9 is a simplified piping diagram showing the flow of gas through the valve mechanism and other components of the present apparatus, the partial perspective view of the various components illustrated therein being similar to the components illustrated in FIG. 7 except rotated 180° in the vertical plane.

As best illustrated in FIGS. 7 and 9, the nitrogen supply such as the supply 20 illustrated in FIG. 1 is in fluid communication with inlet 102 (FIGS. 8 and 9) wherein, through appropriate piping as illustrated in FIG. 9, the nitrogen gas is first fed through a pressure relief valve 104, and then through a pressure regulator 106 before entry into the filter/absorption member 12. The pressure relief valve 104 functions as a safety valve to limit the maximum pressure of the nitrogen gas that can enter pressure regulator 106. Although the pressure of the nitrogen gas leaving the nitrogen supply 20 (FIG. 1) can be regulated with a conventional control valve associated with the nitrogen supply tank 20, pressure relief valve 104 can further regulate and adjust the pressure in the system based upon other system parameters including controlling such nitrogen pressure in the system if the control valve associated with nitrogen supply 20 malfunctions or is improperly set. Excess pressure passing through pressure relief valve 104 is vented to the atmosphere in a conventional manner. Pressure regulator 106 functions in a normal capacity to regulate and adjust the pressure associated with the flow of nitrogen as it enters the filter/absorption member 12. Pressure gauge 108 is associated with pressure regulator 106 and allows a user to monitor the pressure associated with the nitrogen gas flowing into the filter/absorption member 12.

As best illustrated in FIGS. 6 and 7, nitrogen gas exiting the pressure regulator 106 is piped through outlet connection member 109, coupling member 110, and through the inlet hose 112 for entry into the inlet connection associated with one end portion of the filter/absorption member 12 such as the connection member 114 (FIG. 6). The operation of filter/absorption member 12 including chamber 46 and chamber 48 (FIG. 2) is as previously described. The contaminants, other gases and moisture previously associated with the nitrogen are absorbed by the molecular sieve beds and are retained therein until subsequently purged through conventional means as previously explained.

The dried and purified nitrogen exits the filter/absorption member 12 at the outlet connection associated with the opposite end portion of filter/absorption member 12 such as outlet connection member 116 as best illustrated in FIGS. 5 and 6. From the filter/absorption member outlet connection member 116, the dried and purified nitrogen is fed through outlet hose 118, through coupling member 120, through inlet connection member 126 (FIG. 7), and into valve mechanism 122 as best illustrated in FIGS. 7–9.

The valve mechanism 122 is coupled to the coupling member 120 in a conventional manner and includes a three position toggle switch or joy stick handle member 124 which controls the filling and purging operations as previously described. The joy stick 124 includes a first position or center "off" position, a second position (left or right of the center position) or "fill" position, and a third position (left or right of center position) or "purge" position. The joy stick handle member 124 can be either spring loaded back to its center or "off" position, or handle member 124 can be selectively positioned and retained in any one of its three operating positions. As best illustrated in FIG. 7, the valve mechanism 122 includes an inlet connection member 126 through which the flow of nitrogen from the filter/absorption member 12, and from outlet hose member 118, is received for entry into valve mechanism 122. Coupling member 120 illustrated in FIG. 6 is connected to inlet member 126. Valve mechanism 122 includes four outlet ports controlled by the valve mechanism, namely, outlet ports 128, 130, 132 and 134 as best illustrated in FIGS. 7–9. A conventional vacuum pump such as vacuum pump 136 as best illustrated in FIGS. 7 and 9 is coupled to valve mechanism 122 through outlet port 134 in a conventional manner. When the joy stick handle member 124 is in its first position or "off" position, all of the outlet ports 128, 130, 132 and 134 are in their closed position and nitrogen flow from the filter/absorption member 12 is prohibited from exiting the valve mechanism 122 thereby preventing the flow of nitrogen to be used for either filling a tire to be filled or for purging such tire from air and other contaminants.

When the joy stick handle member 124 is moved to its second position or "fill" position, valve outlet ports 128, 130 and 134 are closed and dried/purified nitrogen is allowed to flow through outlet port 132 and through inlet port 138A of a conventional manifold member 138, and through the manifold outlet port 139A to outlet fitting 140 associated with the housing body portion 90 as best illustrated in FIGS. 5 and 6 for delivery to the particular tire to be filled. The simplified piping diagram illustrated in FIG. 9 illustrates the flow of nitrogen through the valve mechanism 122 and through its associated outlet ports to the tire to be filled. In this regard, since the only valve outlet port opened during the filling operation is outlet port 132, nitrogen flows through outlet port 132 into the inlet port 138A associated with manifold member 138 and exits the manifold outlet port 139A for delivery of the nitrogen to the outlet fitting 140. Outlet fitting 140 is attached to the supply hose 142 (FIG. 5) for delivering the nitrogen to the particular tire to be filled. As previously described, supply hose 142 likewise includes a conventional tire chuck 144 for facilitating inflation of the tire. Since outlet port 128 of valve mechanism 122 is closed during the filling process, no nitrogen flows from outlet port 128 to the opposite inlet port 138B associated with manifold member 138. Also, when the joy stick handle member 124 is in the "fill" position, the vacuum pump 136 remains in its "off" state since outlet ports 130 and 134 are closed and nitrogen is not allowed to cycle through the vacuum pump as will be hereinafter further explained.

As best illustrated in FIG. 9, a digital tire pressure gauge such as the gauge 16 (FIGS. 6–9) is likewise coupled to the second outlet port 139B of manifold member 138 for monitoring the tire pressure during the filling operation so that the tire can be filled to a predetermined tire pressure as previously explained.

When the joy stick handle member 124 is moved to its third position or to its "purge" position, valve outlet ports 128, 130 and 134 are open and valve outlet port 132 is closed. This means that dried/purified nitrogen from the filter/absorption member 12 will flow through valve mechanism 122 and through outlet ports 128, 130 and 134 thereby allowing vacuum pump 136 to operate and to draw a vacuum on the tire to be filled through the supply hose 142 in a conventional manner so as to purge the tire of air and other contaminants. Since valve outlet port 132 is closed during the purging operation, no nitrogen can flow through outlet port 132 to the manifold member 138. Nitrogen flowing through outlet port 130 is piped through the vacuum pump 136 as best illustrated in the piping diagram set forth in FIG. 9 thereby creating a vacuum at outlet port 134 sufficient to draw a vacuum through the supply hose 142 for purging air and other contaminants from the tire to be filled. In this regard, during the purging operation, flow is reversed such that air and other contaminants are sucked from the tire to be filled, through the supply hose 142, through the outlet fitting 140, and as best illustrated in the piping diagram set forth in FIG. 9, such flow continues through the outlet port 139A of manifold member 138 and through inlet port 138A back through valve outlet port 128 into valve mechanism 122. Valve mechanism 122 then directs the purged flow containing air and other contaminants via internal porting back out through valve outlet port 134 for exhausting through the exhaust port (now shown) associated with the vacuum pump 136. Also, as nitrogen flows through the vacuum pump 136 for creating the necessary vacuum and suction through supply hose 142, such nitrogen is mixed with the purged flow, all of which is exhausted through the exhaust port (not shown) associated with the vacuum pump 136 as previously explained with respect to embodiment 10. Movement of the joy stick handle member 124 therefore allows the user to again easily control both the purging and filling of a particular tire with nitrogen. A user can easily manipulate the three position joy stick handle member 124 and can easily and quickly switch back and forth from a filling operation to a purging operation without repeatedly removing the valve stem associated with the tire to be filled during each successive purging and filling operation as previously explained. Any number of successive intervening purging and filling operations can be accomplished on the same tire depending upon the particular application as previously explained.

Although the tire purge/fill apparatus 86 illustrated in FIGS. 5–9 is structured somewhat differently from the apparatus 10 illustrated in FIGS. 1–3 including using a different valve mechanism and other components such as the pressure relief valve 104 and a pressure regulator 106, the operation of the apparatus 86 is substantially identical to the operation of apparatus 10 as previously explained. Operation and use of the apparatus 86 can be accomplished through proper positioning of the joy stick handle member 124 as previously explained, and the successive purging and filling operations can be accomplished as previously explained with respect to embodiment 10 by initially deflating the tire to be filled and thereafter appropriately attaching the tire chuck 144 to the valve stem of the tire to be filled.

As with embodiment 10, it is recognized and anticipated that the specific valve mechanism 122 described in association with embodiment 86 can be replaced with any valve mechanism which will accomplish the stated operation. It is likewise recognized and anticipated that other components associated with the embodiment 86 may be eliminated, modified, and/or interchanged with other comparable components so long as the stated operation is again achieved. Other variations and modifications to the embodiment 86 are likewise anticipated and contemplated. Still further, it is recognized that use of the manifold member 72 illustrated in FIG. 4, or any other similar manifold type member can likewise be utilized with the apparatus 86 in a manner similar to that described above with respect to apparatus 10.

As best illustrated in FIG. 5, the tire purge/fill apparatus 86 provides for a convenient and easily transportable device which can be easily carried from one location to another for use when needed. Also, the carrier assembly 88, when closed, completely encloses the various components of the present apparatus. When the cover member 92 is removed, the lower body portion 90 of the carrier assembly 88 likewise protects the valving mechanism 122 and its associated components and provides easy access to the joy stick handle member 124 for operation of the apparatus as previously explained.

Use of the present apparatus 10 or 86 including use of the manifold member 72 in conjunction therewith affords a user distinct advantages over the known apparatus and method for purging and filling racing tires with nitrogen. Use of the various embodiments of the present apparatus and method allows an operator to quickly change from a purging operation to a filling operation without manually removing the valve stems from each respective tire to be filled between each intervening purging/refilling operation. Also, the drying and purifying of the nitrogen gas before entry into a particular tire is accomplished more effectively through the use of the two-stage filter/absorption member 12 thereby substantially improving and increasing the consistency and purity of the nitrogen being provided to each respective tire. Use of the various embodiments of the present apparatus in accordance with the various methods for inflating racing tires as disclosed and taught above substantially reduces the overall time in effectively filling such tires to a predetermined pre-race tire pressure. Also, although the various embodiments of the present apparatus have been described with respect to using nitrogen gas to purge and/or fill racing tires, it is also recognized and anticipated that other gases besides nitrogen including different combinations of gases may likewise be used with the present apparatus without departing from the spirit and scope of the present invention. In such an event, the filter member 12 may have to be modified in order to filter the particular gas or combination of gases being used.

It is also anticipated and recognized that the overall dimensions of the present apparatus as well as the specific shape and configuration of the various members associated therewith are all subject to wide variations and a wide variety of different filter/absorption systems, valving mechanisms, pressure relief valves, pressure regulators, adapters, coupling members, conduits, hoses and other attachment and connection means can be used in the practice of the present invention so long as the stated objectives are achieved. Other variations and modifications to the various components comprising the present structures are also contemplated.

As is evident from the foregoing description, certain aspects of the present invention are not limited by the particular details of the examples illustrated herein, and it is therefore contemplated that other modifications and applications, or equivalents thereof, will occur to those skilled in the art. All such changes, modifications, variations and other uses and applications which do not depart from the spirit and scope of the present invention are deemed to be covered by this disclosure.

The invention claimed is:

1. A tire purge/fill apparatus for both purging air from a tire to be filled and for filling a tire with a gas to a pre-determined pressure, the apparatus comprising:
a supply of gas for filling a tire to be filled;
a filter member coupled in fluid communication with said supply of gas for filtering the gas before entry into the tire to be filled;
a valve mechanism for controlling the purging and filling operations;
a vacuum pump coupled in fluid communication with said valve mechanism; and
a supply hose coupled to said valve mechanism for attachment to the tire to be purged and/or filled;
said valve mechanism including at least one user selectable member positionable so as to effect either a filling operation or a purging operation, said valve mechanism providing filtered gas to said supply hose for filling a tire with gas when said at least one user selectable member is positioned so as to effect a filling operation, and said valve mechanism activating said vacuum pump and drawing a vacuum through said supply hose for purging a tire of air when said at least one user selectable member is positioned so as to effect a purging operation.

2. The tire purge/fill apparatus defined in claim 1 wherein said filter member includes a two-stage filter member.

3. The tire purge/fill apparatus defined in claim 2 wherein one stage of said filter member includes a Z3-06 molecular sieve bed, and wherein the other stage of said filter member includes a carbon molecular sieve bed.

4. The tire purge/fill apparatus defined in claim 1 wherein said gas is nitrogen.

5. The tire purge/fill apparatus defined in claim 1 including a pressure relief valve positioned between said supply of gas and said filter member.

6. The tire purge/fill apparatus defined in claim 1 including a pressure regulator positioned between said supply of gas and said filter member.

7. The tire purge/fill apparatus defined in claim 1 including a pressure gauge positioned in fluid communication with said valve mechanism for monitoring the tire pressure during a filling operation.

8. The tire purge/fill apparatus defined in claim 1 wherein said supply hose includes a tire chuck for attachment to a valve stem associated with a tire to be purged and/or filled.

9. The tire purge/fill apparatus defined in claim 1 wherein said valve mechanism includes an on/off valve and a two-way diverter valve.

10. The tire purge/fill apparatus defined in claim 9 wherein said on/off valve controls the flow of gas to said two-way diverter valve.

11. The tire purge/fill apparatus defined in claim 9 wherein said two-way diverter valve controls the purging and filling operations.

12. The tire purge/fill apparatus defined in claim 1 wherein said valve mechanism includes a three position joy stick handle member, said handle member being movable to a first position wherein the valve mechanism is closed and no flow of gas is available for either the purging or the filling operation, a second position affecting the filling operation, and a third position affecting the purging operation.

13. The tire purge/fill apparatus defined in claim 1 including a manifold member attachable to said supply hose, said manifold member including a main flow passageway and a plurality of outlet ports in fluid communication therewith, each outlet port having an on/off valve associated therewith for controlling the purging or filling operation of a tire attached in fluid communication with said respective outlet port.

14. The tire purge/fill apparatus defined in claim 13 including a pressure gauge position in fluid communication with at least one outlet port associated with said manifold member for monitoring the tire pressure of a tire to be filled when the tire is connected in fluid communication with said at least one outlet port during a filling operation.

15. The tire purge/fill apparatus defined in claim 13 wherein said main passageway includes an on/off valve for controlling the flow of gas to said manifold member.

16. A tire purge/fill apparatus for both purging air and other contaminants from a tire to be filled and for filling a tire with a gas to a pre-determined pressure, the apparatus comprising:
a supply of gas for filling a tire to be filled;
a filter member coupled in fluid communication with said supply of gas for filtering the gas before entry into the tire to be filled;
a valve mechanism for controlling the purging and filling operations;
a vacuum pump coupled in fluid communication with said valve mechanism;
a supply hose coupled to said valve mechanism for attachment to the tire to be purged and/or filled; and
a pressure gauge coupled in fluid communication with said valve mechanism for monitoring the tire pressure during a filling operation;
said valve mechanism including a user selectable member positionable between at least a first position wherein said valve mechanism provides filtered gas to said supply hose for filling a tire with said gas, and a second position wherein said valve mechanism activates said vacuum pump for drawing a vacuum through said supply hose for purging the tire of air and other contaminants.

17. The tire purge/fill apparatus defined in claim 16 wherein said filter member includes two chambers, each chamber housing a molecular sieve bed, said first chamber functioning to dry the gas as it passes therethrough and said second chamber functioning to separate and absorb other contaminants which may be associated with the gas as is passes therethrough thereby purifying the gas before exiting said filter member.

18. The tire purge/fill apparatus defined in claim 16 including a pressure relief valve positioned between said supply of gas and said filter member.

19. The tire purge/fill apparatus defined in claim 16 including a pressure regulator positioned between said supply of gas and said filter member.

20. A tire purge/fill apparatus for both purging air and other contaminants from a tire to be filled and for filling a tire with nitrogen to a pre-determined pressure, the apparatus comprising:
a supply of nitrogen gas;
a two-stage filter member in fluid communication with said supply of nitrogen gas for drying and purifying the nitrogen gas before exiting said filter member;
a valve mechanism in fluid communication with said filter member for controlling the purging and filling operations;
a vacuum pump coupled in fluid communication with said valve mechanism;
a supply hose coupled in fluid communication to said valve mechanism for attachment to the tire to be purged and/or filled; and a pressure gauge coupled in fluid communication with said valve mechanism for monitoring the tire pressure during a filling operation;

said valve mechanism including a user selectable member positionable in any one of a first position, a second position, and a third position, said valve mechanism being closed thereby preventing both the purging operation and the filling operation from occurring when said user selectable member is positioned in its first position, said valve mechanism providing nitrogen gas to said supply hose for filling a tire with nitrogen gas when said user selectable member is positioned in its second position, and said valve mechanism activating said vacuum pump and providing filtered nitrogen gas to said vacuum pump for drawing a vacuum through said supply hose for purging a tire of air and other contaminants when said user selectable member is positioned in its third position.

21. The tire purge/fill apparatus defined in claim 20 including a pressure relief valve coupled in fluid communication between said supply of nitrogen gas and said filter member.

22. The tire purge/fill apparatus defined in claim 21 including a pressure regulator coupled in fluid communication between said pressure relief valve and said filter member.

23. The tire purge/fill apparatus defined in claim 20 wherein said supply hose includes a tire chuck for attachment to a valve stem associated with a tire to be purged and/or filled.

24. The tire purge/fill apparatus defined in claim 23 wherein said supply hose includes a quick connect/disconnect coupling member for quickly attaching and detaching said tire chuck thereto.

25. The tire purge/fill apparatus defined in claim 20 including a manifold member for use in filling a plurality of tires at the same time, said manifold member including an inlet port attachable to said supply hose, a main passageway extending through said manifold member in fluid communication with said inlet port, and a plurality of outlet ports in fluid communication with said main passageway, each outlet port being adaptable for accommodating appropriate supply hoses for attaching a tire to be purged and/or filled to said respective outlet port.

26. The tire purge/fill apparatus defined in claim 25 wherein each outlet port includes an on/off valve for controlling the purging and filling operations of a tire attached in fluid communication with said respective outlet port.

27. The tire purge/fill apparatus defined in claim 26 including a pressure gauge positioned in fluid communication with said respective outlet port for monitoring the tire pressure during a filling operation.

\* \* \* \* \*